(12) United States Patent
Maichl et al.

(10) Patent No.: US 9,857,806 B2
(45) Date of Patent: Jan. 2, 2018

(54) VALVE ASSEMBLY AND FLUIDIC SYSTEM

(71) Applicant: FESTO AG & Co., KG, Esslingen (DE)

(72) Inventors: Martin Maichl, Salach (DE); Herbert Hufnagl, Aichwald (DE); Ralf Forcht, Wendlingen (DE)

(73) Assignee: FESTO AG & CO. KG, Esslingen (DE)

( * ) Notice: Subject to any disclaimer, the term of this patent is extended or adjusted under 35 U.S.C. 154(b) by 133 days.

(21) Appl. No.: 14/766,678

(22) PCT Filed: Nov. 22, 2013

(86) PCT No.: PCT/EP2013/003524
§ 371 (c)(1),
(2) Date: Aug. 7, 2015

(87) PCT Pub. No.: WO2015/074674
PCT Pub. Date: May 28, 2015

(65) Prior Publication Data
US 2015/0378370 A1 Dec. 31, 2015

(51) Int. Cl.
*F15B 13/08* (2006.01)
*G05D 16/20* (2006.01)
*F16K 31/02* (2006.01)

(52) U.S. Cl.
CPC ....... *G05D 16/2013* (2013.01); *F15B 13/086* (2013.01); *F15B 13/0857* (2013.01); *F15B 13/0867* (2013.01); *F16K 31/02* (2013.01)

(58) Field of Classification Search
CPC ............... F15B 13/0857; F15B 13/086; F15B 13/0867; G05D 16/2013
See application file for complete search history.

(56) References Cited

U.S. PATENT DOCUMENTS

| 8,156,965 B2 * | 4/2012 | Kremser | G05B 9/02 |
| | | | 137/560 |
| 9,528,617 B2 * | 12/2016 | Maichl | F15B 13/0803 |

FOREIGN PATENT DOCUMENTS

| DE | EP 0962663 A2 * | 12/1999 | ...... F15B 13/0814 |
| EP | 0962663 | 12/1999 | |
| EP | 1041325 | 10/2000 | |
| EP | 1584945 | 10/2005 | |

(Continued)

*Primary Examiner* — Thomas E Lazo
(74) *Attorney, Agent, or Firm* — Hoffman & Baron, LLP

(57) ABSTRACT

A valve assembly for influencing at least one fluid flow, the valve assembly including a control unit and at least one valve device, wherein the control unit includes a bus interface for connection to a bus communication system for the reception of movement instructions, a processing device for processing the movement instructions into control commands for valve devices and at least one connecting device for the electric coupling of valve devices, and wherein the at least one valve device is electrically connected to one of the connecting devices of the control unit and includes a processing means designed for processing the control commands, wherein the processing means is assigned at least one first connecting means for the electric coupling of valves and at least one second connecting means for the electric coupling of sensor means, and wherein the processing means is designed for linking sensor signals of connected sensor means to the control commands.

16 Claims, 3 Drawing Sheets

(56) References Cited

FOREIGN PATENT DOCUMENTS

| | | |
|---|---|---|
| EP | 2026156 | 2/2009 |
| EP | 2549125 | 1/2013 |

* cited by examiner

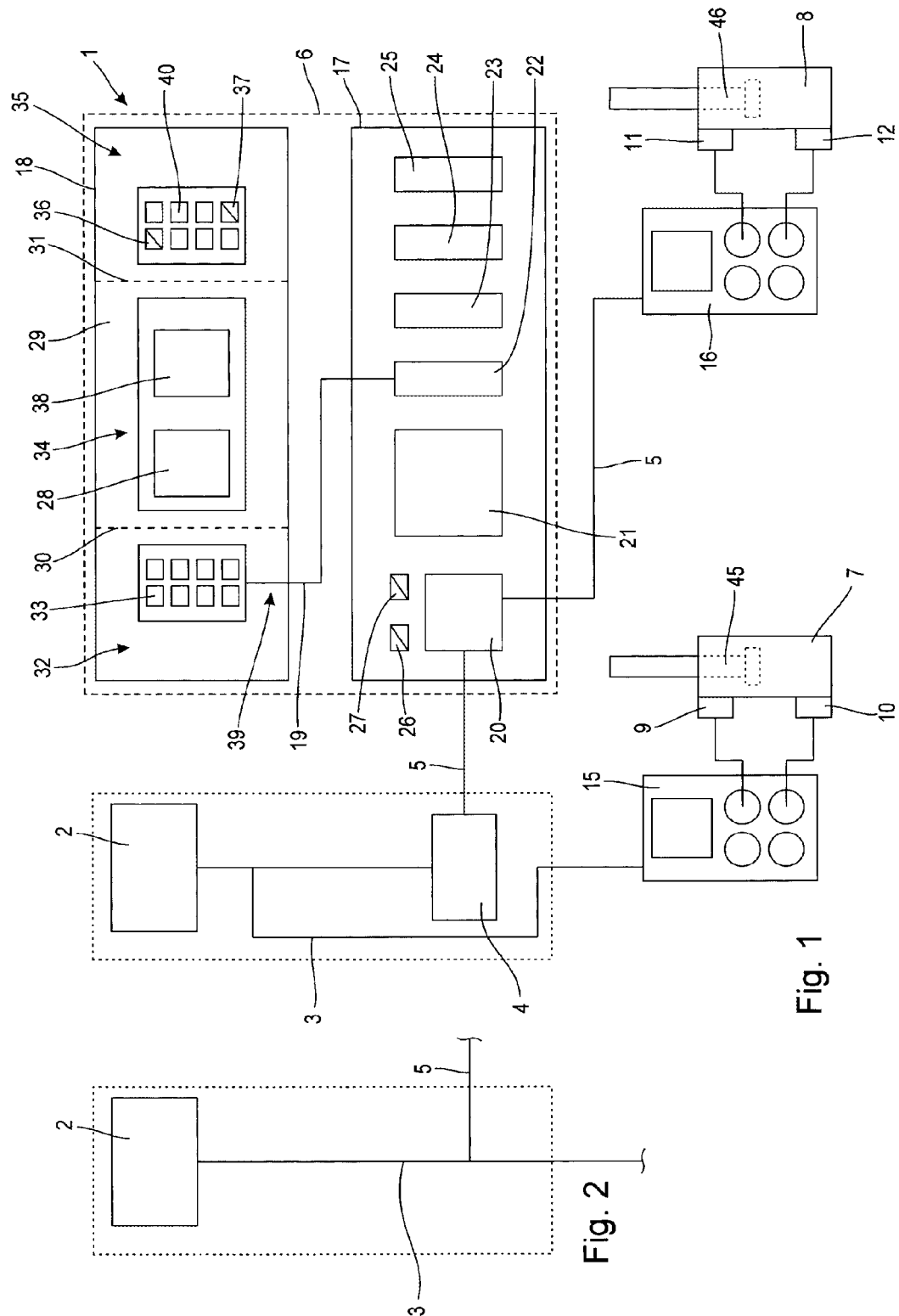

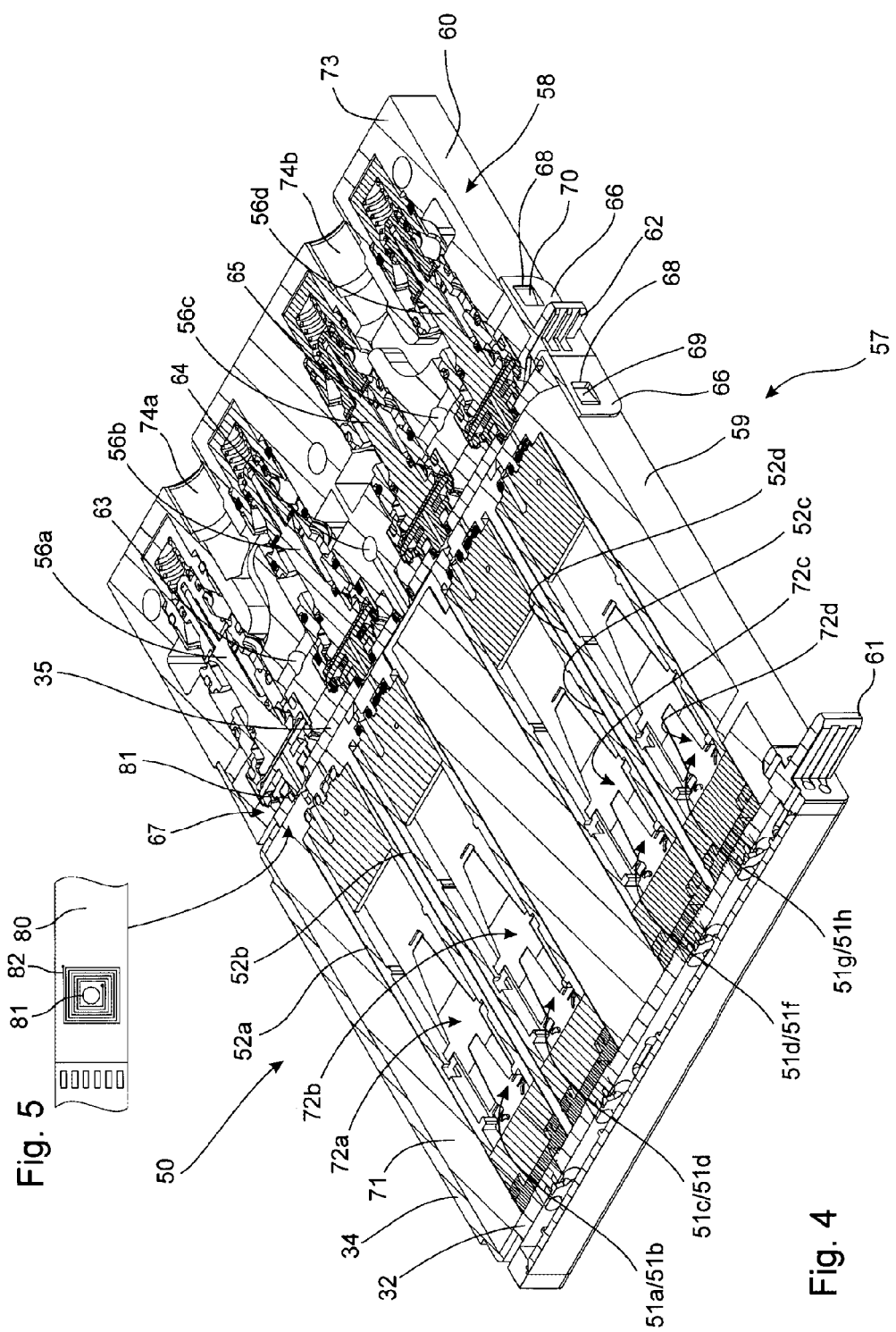

VALVE ASSEMBLY AND FLUIDIC SYSTEM

This application claims priority based on an International Application filed under the Patent Cooperation Treaty, PCT/EP2013/003524, filed Nov. 22, 2013.

BACKGROUND OF THE INVENTION

The invention relates to a valve assembly as used in automation technology, for example, for influencing at least one fluid flow for controlling fluidically operated actuators, such as pneumatic cylinders or pneumatic rotary actuators, in a suitable way. The invention further relates to a fluidic system.

SUMMARY OF THE INVENTION

The invention is based on the problem of providing a valve assembly which facilitates an influencing of at least one fluid flow with a high clock rate, i.e. with a plurality of switching cycles per unit of time.

According to a first aspect, this problem is solved by a valve assembly for influencing at least one fluid flow, the valve assembly comprising control unit and at least one valve device, wherein the control unit comprises a bus interface for connection to a bus communication system for the reception of movement instructions, a processing device for processing the movement instructions into control commands for valve devices and at least one connecting device for the electric coupling of valve devices, and wherein the at least one valve device is electrically connected to the at least one connecting device of the control unit and comprises a processing means designed for processing the control commands, wherein the processing means is assigned at least one first connecting means for the electric coupling of valves and at least one sensor means, and wherein the processing means is designed for linking sensor signals of the at least one sensor means to the control commands.

According to the invention, the valve assembly is therefore subdivided into two essential main components. The first main component is the control unit, which is designed for communication with the bus communication system and for converting the movement instructions into control commands. The second main component is the valve device, which is designed for the practical conversion of the control commands into actual fluid flows and can be connected to valves and sensor means for this purpose. Such a valve assembly can, for example, be connected via a lower-order bus communication system to a bus node, which can in turn communicate with a higher-order control system, such as a programmable logic controller, via a higher-order bus communication system. Alternatively, it can be provided that the valve assembly is directly connected to the higher-order bus communication system without the interposition of a bus node. As both the control unit and the valve device of the valve assembly are provided with computers in the form of the processing device or the processing means respectively and therefore have a certain amount of processing power, it can preferably be provided that the higher-order control system transmits abstract movement instructions, in particular via the bus node, to the valve assembly, these movement instructions including only very few, if any, details about the execution of the respective movement. These details are only determined by processing the movement instructions in the processing device or the processing means respectively, using suitable algorithms and including specific parameters and measured values of the connected valves and sensor means. This means that, on the one hand, a communication between the higher-order control system and the valve assembly requires only a small bandwidth for the transmission of the abstract movement instructions and that, on the other hand, the calculations required for the conversion of the movement instructions can be performed on site in the direct vicinity of the valves to be controlled. Furthermore, it is advantageous that, in addition to the first connecting means designed for the electric coupling of electrically actuated valves, the processing means are also assigned second connecting means for the electric coupling of sensor means. As a result, sensor signals of connected sensor means can be processed directly in the processing means. This facilitates a particularly fast and efficient inclusion of states of the valves connected to the first connecting means and/or of fluidic loads which are fluidically connected to the valves and equipped with suitable sensor means in the processing means. The processing device is preferably given the task of coordinating the actions of several valve devices for the desired conversion of the movement instructions into corresponding fluid flows to be enabled by the connected valves and into the resulting movements of connected actuators. This being so, a bidirectional communication between the control unit and the valve device is advantageous, because, in this way, both sensor signals arriving at the valve devices and actuating signals from the valve devices for the individual valves can be transmitted to the processing device, enabling it to perform its task as a control agency for the individual valve devices.

Advantageous further developments of the invention are specified in the dependent claims.

It is expedient if the control unit is accommodated in a first housing and the at least one valve device is accommodated in a second, separate, housing, and if a conductor-bound connection is provided between the control unit and the valve device. In this way, the valve devices can be mounted directly on the actuators intended to be controlled by means of the fluid flows which can be enabled by the assigned valves. The control unit, on the other hand, has the task of supplying several of the valve devices with suitable control commands and of coordinating the valve devices, so that a remote placing of the control unit is advantageous. In the illustrated embodiment, a serial data transmission, in particular via a synchronous serial data bus according to the Serial Peripheral Interface Standard (SPI Standard), is provided for the conductor-bound connection between the control unit and the valve device. In this way, an efficient data transmission of the control commands and of the feedback of the individual valve devices to the control unit can be ensured.

In a further development of the invention, it is provided that at least one pressure sensor for detecting a fluid pressure and/or at least one position sensor for detecting a valve position of a valve is/are connected to the second connecting means of the valve device. A functional state of a valve connected to the valve device can be detected both by means of the pressure sensor and by means of the position sensor, which is in particular designed as a stroke sensor for the detection of a valve stroke, so that the valve device can, either continuously or at given points in time, request information on whether the valve has adopted a predetermined valve position and/or whether a corresponding fluid pressure is present at a measuring point where the pressure sensor is located. In this way, an advantageous monitoring of the valve functions of the valves connected to the valve device can be implemented.

It is preferably provided that at least one fluidic actuator is coupled to at least one of the valves, that the processing device is designed for determining movement profiles for the at least one fluidic actuator, using movement instructions, and that the processing device and/or the processing means is/are designed for converting the movement profiles into actuating signals for the valves. The processing device in the control unit is therefore responsible for converting incoming movement instructions of the higher-order control system into movement profiles for the actuator, in order to enable the processing means to control the valves connected to the respective valve devices in a suitable way. These movement profiles go beyond a simple switching of the valves, which are designed as proportional valves in particular, and will for example include preset values for varying the fluid flow through the valve to be controlled, in order to facilitate an advantageous control of the load, in particular the actuator, connected to the valve. The movement profiles, which may for example be transmitted as control commands from the control unit to the valve device, are converted into actuating signals for the valves in the processing means of the valve device.

In addition or alternatively, it may also be provided that the movement profiles are partially or wholly converted into actuating signals in the processing device; these are then made available to the processing means for generating the desired actuating signals for the control of the valves.

In the illustrated embodiment, the provision of a ramp-type movement profile from the processing device to the processing means results in a likewise ramp-type actuating signal for the valve to be controlled. If the processing device is aware of a special characteristic of the in particular electric drive of the connected valve, an actuating signal which is individually tailored to the drive for the respective valve can nevertheless be derived from the ramp-type movement profile. This individual actuating signal can differ significantly from the ramp-type movement profile and is intended to lead to a change in the fluid flow through the connected valve, by which the ramp-type movement profile is represented in the form of a corresponding action, in particular of a movement of the connected fluidic load. In this context, it is advantageous that the processing means can be precisely adapted to the connected valves either at the electric level and/or by suitable programming, thereby facilitating a particularly efficient and fast control of the valves. Furthermore, the division into movement instructions, movement profiles and actuating signals ensures that only a small quantity of data has to be transmitted between the processing device and the processing means, because, owing to the local intelligence in the processing means, the calculations required for the correct control of the valves in accordance with the preset movement profiles can be carried out locally in the processing means.

In a further development of the invention, it is provided that at least one external sensor device is assigned to the processing device, and that the processing device is designed for a reception of the sensor signals of the at least one external sensor device via the lower-order bus communication system and for processing the sensor signals of the at least one external sensor device, and that the processing device comprises a storage device in which at least one control algorithm, in particular a position controller and/or a pressure controller, is stored. This enables the processing device to access not only sensor signals of sensor means assigned to the valve devices, but also sensor signals of external sensor devices for the necessary coordination of the connected valve devices. It may, for example, be provided that sensor signals of external sensor devices which are only indirectly associated with the function of the fluidic loads, in particular the fluidic actuators, which are in turn connected to the valve devices, are made available via the lower-order bus communication system. The external sensor device may, for example, be a camera system with downstream image processing, which checks a machining outcome of a machining step performed by at least one actuator connected to the valve device and provides a go/no-go signal. By including signals of external sensor devices, the operational reliability of an automation system equipped with the valve assembly according to the invention can be increased. In addition, using the incoming sensor signals, the processing device can determine a controlled variable, in particular at least one fluid pressure provided by the valve assembly or a position of an actuator. For this purpose, the processing device comprises, in addition to a storage device for storing at least one control algorithm, a random access memory region in which the respective algorithm can run with the inclusion of the sensor signals and determine the required control variable for making it available to the associated valve device. The control algorithm of the illustrated embodiment can be designed as a pressure controller for controlling the pressure of a fluid to be provided to the actuator. Alternatively, the control algorithm can be designed as a position controller by means of which a valve position or a position of the actuator can be controlled in particular.

It is particularly advantageous if several control algorithms, which can optionally be selected in a suitable selection process and, if applicable, parameterised by user input or by an automatic recognition of connected valve devices and connected valves, are stored in the storage device.

In an advantageous variant of the processing device, it is provided that user inputs, which may for example be aimed at the selection and/or the parameterisation of a control algorithm, can be made available to the processing device via the lower-order bus communication system. It may in particular be provided that an input device, such as a laptop or personal computer, by means of which the desired controller selection and/or parameterisation is/are carried out, is connected to a bus node connecting the lower-order bus communication system to a higher-order bus communication system. It is particularly advantageous if a web server designed for the provision of a standardised user interface for performing the desired user adjustments on the connected input device is integrated into the bus node or, alternatively, into the processing device.

In an advantageous further development of the invention, it is provided that at least one fluidic actuator is coupled to at least one of the valves, that the at least one sensor device is assigned to the actuator, and that the processing device and/or the processing means, together with the sensor means and/or the sensor devices, form(s) a control loop for controlling a pressure for influencing a position of the actuator. By optionally or jointly including sensor signals of the sensor means and/or sensor devices, a function of the fluidic actuator to be controlled by the valve assembly can be checked either indirectly by monitoring fluid flows made available to the actuator or directly by monitoring actual movements of the actuator or indirectly by monitoring machining results to be obtained with the actuator. The intelligence gained in this monitoring process with the aid of suitable sensor means, such as pressure sensors for the determination of a fluid pressure for the actuator, position sensors for the determination of an actuator position or an image processing device for the determination of a working result, is preferably used as actual values for a control loop designed as a pressure controller for the fluid pressure at the actuator. This facilitates a particularly flexible reaction to varying requirements in the automation system equipped with the valve assembly. It is particularly advantageous if the data of the various sensor means and sensor devices are combined to generate an overall impression of the operation of the actuator. This processing of sensor signals preferably occurs in the processing device of the control unit, which has the necessary computing capacity for processing a multitude of sensor signals and which is furthermore configured for the reception and processing of sensor signals of the external sensor devices. The sensor signals of the sensor means can either be processed directly in the processing means and transmitted to the processing device in a combined manner or optionally be made available directly by the processing means in the form or raw data without further conditioning to the processing device. In either case, it is provided that a control, in particular a position or speed control of the movement of the fluidic actuator connected to at least one of the valves of the valve assembly is carried out with the aid of the available sensor signals. It is particularly advantageous if several nested control loops are used for controlling the movement of the fluidic actuator, taking account of the sensor signals of the sensor means and sensor devices and using the processing means and the processing device. This can, for example, be obtained by combining a pressure control for the fluid flows provided for the fluidic actuator by the valves with a higher-order position control for the fluidic actuator. In the processing device, sensor signals of the sensor means and/or of external sensor devices, in particular position sensors, are evaluated. There is a corresponding data exchange between the processing device and the processing means, for example in order to influence the pressure control of the processing means as a function of requirements of the position control of the processing device.

It is advantageous if the processing means is designed for transferring processed sensor signals of the sensor means to the control unit. In this way, the processing device can obtain data on the functional state of valves and of the associated fluidic actuators which are connected to the respective valve devices, enabling it to coordinate a provision of movement profiles to the individual valve devices in order to obtain the desired movements of the fluidic actuators to be controlled.

In a further development of the invention, it is provided that the processing means comprises at least one control means for a valve, which control means is designed for providing an electric supply energy, in particular a supply voltage, for at least one valve. This control means may, for example, be an electric output stage controlled by means of actuating signals, in particular electric control voltages, in order to provide an electric power required by the respective valve in response to demand. The actuating signal is preferably an analogue output signal which is provided by the processing means, which is designed as a microcontroller in particular. The valve is preferably a piezoelectric valve which can be adjusted by means of an electric supply voltage between a closed position and an open position and which for this purpose comprises a cantilever beam which can be changed in its geometry by the supply voltage and which is at least partially made of a piezoelectric material.

In a further development of the invention, it is provided that several, in particular eight, independently selectable valves serving as pneumatic pilot valves are connected to the first connecting means, and that the valves are coupled to in particular four pneumatically selectable main valves designed for providing fluid at in particular two working ports. This being so, the valve assembly with the connected piezoelectric valves and main valves preferably forms a fluidic full-bridge circuit by means of which, depending on the control of the valves and the resulting fluidic control of the main valves at the working ports, various valve configurations, such as 2/2-way valves, 3/2-way valves or 5/2-way valves, can be emulated. The pilot valves and/or the main valves can be designed as proportional valves or as switching valves operated in the manner of proportional valves by suitable means. This in particular applies to situations in which eight independently selectable piezoelectric valves are connected to the first connecting means and pairs of these piezoelectric valves are provided for a fluidic control of a total of four pneumatically selectable main valves.

It is expedient if at least one working port is assigned a pressure sensor connected to the second connecting means of the valve device, and/or if at least one main valve is assigned a position sensor for detecting the valve position of the main valve. With these sensor means, which may be designed as pressure sensors and/or position sensors, the processing means can implement a pressure control for the fluidic control of the main valve and/or a position control for the main valve. In this context, it can preferably be provided that the sensor means are directly, i.e. without the interposition of complex bus systems, coupled to the processing means, and that the processing means are configured to process the sensor signals usually present as electric signal levels, in particular to digitise them and to process them in a suitable manner, preferably using stored programmes, in a microcontroller.

It is preferably provided that the control unit and/or the valve device comprise(s) an ambient pressure sensor and/or a supply pressure sensor, and that the processing device is designed for a reception of a sensor signal of the ambient pressure sensor and/or of a sensor signal of the supply pressure sensor. By knowing the ambient pressure and the supply pressure provided for the valves of the valve device, the control unit can precisely and efficiently evaluate the sensor signals of pressure sensors which are assigned to the valve device. The pressure sensors are preferably designed as absolute pressure sensors, so that a particularly compact design can be chosen for these pressure sensors, which can therefore be assigned to the respective valves in a particularly advantageous way. It can optionally be provided that the sensor signals of the ambient pressure sensor and/or of the supply pressure sensor are processed in the control unit and made available to the valve device, or that the sensor signals of the ambient pressure sensor and/or of the supply pressure sensor, which are processed in the control unit, are processed in the control unit with the sensor signals of the sensors assigned to the valve device.

According to a second aspect, the problem on which the invention is based is solved by a fluidic system wherein the fluidic system comprises a control device designed for making available movement instructions to a higher-order bus communication system, comprising a higher-order bus communication system designed for a data communication between the control device and at least one valve assembly according to any of claims 1 to 13, which is connected to the bus communication system. In this, the valve assembly comprises the function of a bidirectional conversion of bus commands made available via the a higher-order bus communication system into control commands and of state information, in particular sensor signals, of valve devices forming a part of the valve assembly into bus commands for transmission to the control device.

In a further development of the fluidic system, it is provided that a bus coupler designed for a bidirectional conversion of bus commands between the a higher-order bus communication system and a lower-order bus communication system is provided between the a higher-order bus communication system and the control device, the lower-order bus communication system being formed between the bus coupler and the control device. The bus coupler is preferably designed to be interchangeable, so that the valve assembly can be adapted to a higher-order bus communication systems of different designs by coupling a suitably configured bus coupler to the control device.

In a further development of the fluidic system, it is provided that at least one actuator is fluidically connected to the valve assembly, that at least one input/output device is connected to the bus communication system, and that the actuator is assigned at least one position sensor directly connected to the input/output device to facilitate a provision of a position signal to the processing device.

In a further development of the fluidic system, it is provided that the valve assembly comprises a valve housing in which valve shafts are formed for the accommodation of pairs of valve cartridges, and that it further comprises valve cartridges which are located in the valve shafts, wherein each of the valve shafts together with the valve cartridges located therein bounds a pressure chamber in fluidically communicating connection to an associated input port, and wherein each of the valve cartridges comprises two electrically selectable valves, each of which is designed to influence a free flow cross-section between the pressure chamber and an output port assigned to the respective valve.

BRIEF DESCRIPTION OF THE DRAWINGS

Advantageous embodiments of the invention are illustrated in the drawing, of which:

FIG. 1 is a diagrammatic representation of a fluidic system comprising a higher-order control device, a higher-order and a lower-order bus communication system and a valve assembly comprising a control unit and a valve device as well as several actuators and associated sensors, FIG. 2 shows a section of FIG. 1 with an alternative coupling between the valve assembly and the higher-order bus communication system, FIG. 4 is a perspective view of an actual embodiment of the valve assembly shown in FIG. 1, and FIG. 5 is a plane, diagrammatic detailed view of a sensor means from FIG. 4.

DETAILED DESCRIPTION OF THE PREFERRED EMBODIMENTS

Figure 3:
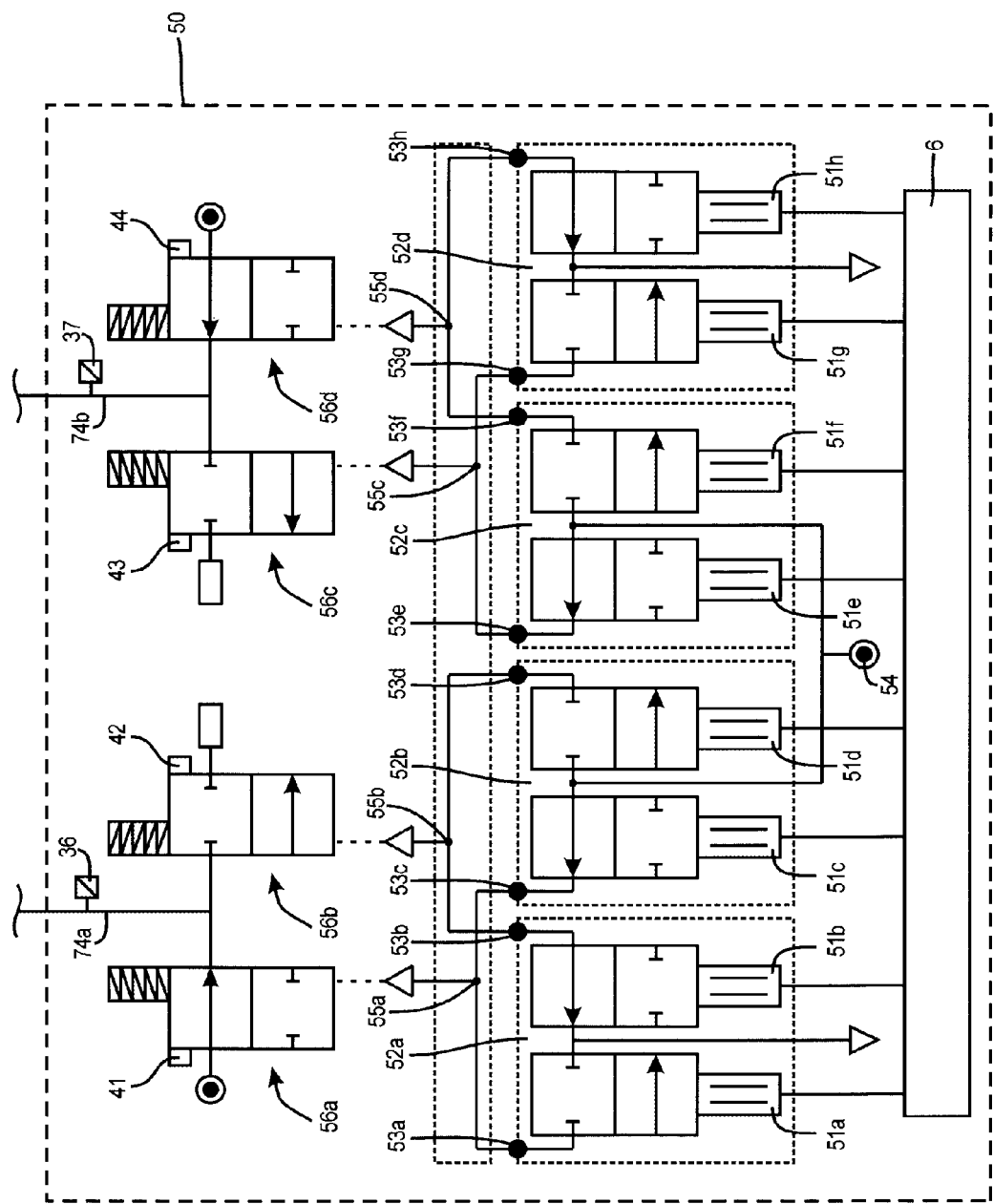
FIG. 3 is a diagrammatic representation of a valve assembly comprising eight independently selectable piezoelectric valves and four main valves which are pneumatically selectable by the piezoelectric valves.

A fluidic system 1 represented diagrammatically in FIG. 1 comprises a higher-order control device 2, a higher-order bus communication system 3, a bus coupler 4, a lower-order bus communication system 5, a valve assembly 6 and a plurality of actuators 7, 8, external sensor devices 9 to 12 assigned to the actuators 7, 8 and input/output modules 15, 16.

Such a fluidic system 1 can, for example, be used for automation purposes in a complex machining station not shown in detail, for example in order to temporarily clamp or convey workpieces not shown in detail by means of the actuators 7, 8. In order to coordinate the individual sequences in such a machining station, there is, for example, provided a higher-order control device 2, such as a programmable logic controller (PLC), which is connected to a higher-order bus communication system 3 for communication with a plurality of bus subscribers. The bus subscribers may, for example, be a motor controller not shown in the drawing for controlling electric motors which are likewise not shown in the drawing, or bus couplers 4 designed for incorporating sub-components of a complex design, such as the valve assembly 6, into the fluidic system 1. Such complex sub-components can operate with an internal bus communication protocol which is independent of the bus communication protocol of the higher-order bus communication system 3, in order to be able to address a plurality of bus subscribers within the lower-order bus communication system 5. While the higher-order bus communication system 3 typically is a field bus system according to one of the common field bus standards, the lower-order bus communication system 5 typically is a proprietary bus communication protocol which is individually tailored to the requirements of the subscribers to the lower-order bus communication system 5.

To simplify the drawing, only a single bus subscriber designed as a valve assembly 6, the structure and function of which will be explained in greater detail at a later point, is connected to the lower-order bus communication system 5. The valve assembly 6 comprises a control unit 17 and a valve device 18. In the illustrated embodiment, it is provided that the control unit 17 and the valve device 18 are structurally separated from one another and accommodated in housings not shown in detail. The control unit 17 is used for the control of several valve devices 18, of which only one is shown for greater clarity. Between the control unit 17 and the valve device 18, a communication connection is provided, which is represented by a connecting cable 19 in the illustrated embodiment. The communication connection can, for example, be designed as a digital serial data communication, in particular according to the SPI (serial peripheral interface) standard for a bidirectional communication between the control unit 17 and the valve device 18.

The control unit 17 is designed as an electronic circuit and comprises several electronic components which are arranged on a printed circuit board. The electronic components, which will be described in greater detail below, are essential for the functionality of the control unit 17, while further electronic and electric components not described in detail serve as peripherals, for example providing the power supply and the internal and external electronic communication between the electronic components described below. In the illustrated embodiment, it is provided that the control unit 17 comprises an electronic communication module 20 acting as a bus interface, which is provided for a reception, processing and transfer of data made available via the lower-order bus communication system 5. For this purpose, the communication module 20 of the illustrated embodiment is connected both to the bus coupler 4 and to the input/output module 16 designed for connection to the lower-order bus communication system 5. The electronic communication module 20 can check data arriving via the lower-order bus communication system 5 to establish whether they may be intended for the control unit 17. The electronic communication module 20 can furthermore output data to the lower-order bus communication system 5, for example in order to transmit messages concerning the function of the control unit 17 and the connected components to the control device 2. It may further be provided that the electronic communication module 20 can transfer data provided for influencing, in particular controlling or parameterising, further bus communication subscribers to other subscribers to the lower-order bus communication system 5. Insofar as the communication module 20 can derive information intended for the control unit 17 from data arriving via the lower-order bus communication system 5, it can transfer this information to a processing device 21.

The processing device 21 of the illustrated embodiment is designed as a computing unit, in particular in the form of a microcontroller or microprocessor, and comprises a storage device not shown in detail. The processing device 21 is responsible for processing data provided by the electronic communication module 20 on the one hand and made available by connecting devices 22 to 25 and valve devices 18 connected thereto on the other hand. An essential function of the processing device 21 is to isolate from the data transmitted by the lower-order bus communication system 5 and made available by the communication module 20 movement instructions describing an actual movement of an actuator 8 to be controlled by the valve device 18. On the arrival of such movement instructions, it is provided that the processing device 21 initially determines the current status of the actuator 8. For this purpose, for example, sensor signals from external sensor devices and from sensor means assigned to the valve device 18 are processed in the processing device 21.

On the basis of this determination of the current state of the connected actuator 8, the processing device 21 can in a subsequent operating step provide a movement profile for the connected actuator 8, which is then made available to the at least one valve device 18. This movement profile may, for example, be a specification for a chronological movement sequence of the connected actuator 8; this is in the valve device 18 converted into actuating signals for enabling the associated fluid flows which are to be released by the individual valves connected to the valve device 18 and are to be made available to the actuator 8. In the storage device of the processing device 21, which is not shown in the drawing, at least one control algorithm by means of which the actuator 8 and in particular its position can be controlled is preferably stored. The at least one stored control algorithm can preferably be parameterised to adapt it to the characteristics of the connected actuator 8. For this purpose, the processing device 21 can be accessed via the lower-order bus communication system 5 with the aid of the electronic communication module 20 and the bus coupler 4 by way of a suitable input device connected to the bus coupler 4. The input device may, for example, be a personal computer, in particular a laptop. It is particularly advantageous if the bus coupler 4 and/or the processing device 21 comprise(s) a web browser which provides, in accordance with a predetermined protocol, a user interface for the connected input device, in particular in the form of an input mask for the parameters in question.

The control unit 17 further comprises at least one pressure sensor, in particular a supply pressure sensor 26 and an ambient pressure sensor 27. By means not shown in detail, the supply pressure sensor 26 is connected to a fluidic supply line designed for the provision of fluid flows to the valves not shown in the drawing, which are connected to the valve device 18. The ambient pressure sensor 27 is provided for detecting an ambient pressure in the surroundings of the control unit 17. In the illustrated embodiment, it is provided that the supply pressure sensor 26 and the ambient pressure sensor 27 are designed as absolute pressure sensors, so that pressure is measured against an internal vacuum in the respective pressure sensor. This is particularly advantageous if the valve device 18 is also equipped with absolute pressure sensors to be described at a later point.

The valve device 18, which is likewise shown diagrammatically in FIG. 1, comprises as a central component a processing means 28 designed as a computing unit, in particular a microcontroller or microprocessor, which is located on a printed circuit board 29. In the illustrated embodiment, the printed circuit board 29 is produced with electric conductors not shown in detail, which are made of a flexible material composite, so that it can, for example, be folded at the bending edges 30 and 31 by 90 degrees each for an advantageous integration into a valve module described in greater detail below. The bending edges 30 and 31 divide the printed circuit board 29 into three regions 32, 34, 35, but another arrangement can also be chosen, or the printed circuit board 29 may not be folded at all. In the illustrated embodiment, a connecting region comprising a plurality of electrically conductive connecting contacts provided for an electric connection to valves not shown in the drawing is formed in the first region 32 of the printed circuit board. In the second region, the processing means 28 with electric and, if applicable, electronic peripherals not shown in detail is located, these peripherals in particular including electronic components such as resistors, capacitors or integrated circuits. In the illustrated embodiment, the second region 34 also comprises an electric output stage arrangement 38, which is electrically coupled to the processing means 28 and can, if receiving electric signals from the processing means 28, make available a corresponding electric power to the respective connecting contacts 33 for the electric control of the connected valves not shown in the drawing.

In the third region 35 of the printed circuit board 29, two pressure sensors 36, 37 are located; these are preferably designed as absolute pressure sensors for a determination of a fluid pressure, in particular at a working port of a valve module. The third region 35 is further provided with electric connections 40 for position sensors not shown in detail, by means of which, for example, the position of pneumatically piloted main valves can be detected.

The processing means 28 are designed for a communication with the processing device 21 via a conductor-bound communication link 39, which is cabled in the illustrated embodiment. The communication link 39 is routed to one of the connecting devices 22 to 25 of the control unit 17 via the connecting cable 19. The communication link 39 is preferably bidirectional between the processing means 28 and the processing device 21 in accordance with the SPI protocol. The processing means 28 can in particular receive control commands of the processing device 21, in order to convert these locally into actuating signals for the valves connected to the connecting contacts 33 and not shown in the drawing by suitable processing methods, in particular using stored or permanently programmed-in algorithms. The processing means 28 are further designed for processing sensor signals provided by the pressure sensors 36 and 37 and the position sensors not shown in the drawing, which are connected to the electric connections 40. In this arrangement, the pressure for the valves can, for example, be controlled by the processing means 28 on the basis of the signals of the pressure sensors 36 and 37, and/or the position for the valves can be controlled on the basis of the signals of the position sensors connected to the electric connections 40, resulting in a corresponding control of the valves connected to the connecting contacts 33 and not shown in the drawing.

The sensor signals made available at the connections 40 by the connected sensors, in particular the pressure sensors 36 and 37 and the position sensors, can, in addition to the direct processing in the processing means 28, also be made available to the processing device 21 as raw data or raw signals. The processing device 21 is designed such that it can also use control algorithms on the basis of such raw data or raw signals, if applicable linked to sensor signals of external sensor devices 9, 10 made available via the lower-order bus communication system 5, for example in order to control the position for one of the connected actuators 7 or 8. In the illustrated embodiment, the position sensors 9 to 12, which are provided for determining a position of a piston 45 or 46 of the actuators 7, 8 designed as pneumatic cylinders, are located both on the actuator 7 and on the actuator 8. The position sensors 9 and 10 are coupled to the higher-order bus communication system 3 via an external input/output module 15. In accordance with this, the position signals of the position sensors 9 and 10 are transmitted to the processing device 21 via the higher-order bus communication system 3, the bus coupler 4 and the lower-order bus communication system 5 as well as via the communication module 20. The position sensors 11 and 12, on the other hand, are connected to the internal input/output module 16, which communicates directly with the communication module 20 via the lower-order bus communication system 5, resulting in a particularly short signal propagation time between the sensors and the processing device 21.

An alternative connecting arrangement shown in FIG. 2 is provided for the valve assembly 6, in which a direct communication is provided between the control device 2, the valve assembly 6 and the input/output module 15. For this purpose, it is provided that the electronic communication module 20 from FIG. 1 is modified for a direct communication between the control device 2 and the valve assembly 6. This construction is preferred if the fluidic system does not require any variability in terms of the control of a communication protocol, but the valve assemblies 6 are always connected to the same higher-order bus communication system 3.

FIG. 3 illustrates an exemplary application case for a valve assembly 6 shown in FIG. 1. The valve assembly 6 is electrically connected to a valve disc 50 and provided in the illustrated embodiment for the electric control of eight piezoelectric valves 51a to 51h. Each of the piezoelectric valves 51a to 51h is electrically connected in a way not shown in detail to one of the connecting contacts 33 of the valve assembly 6, which are shown in FIG. 1, and can therefore be individually supplied with electric energy through the processing means 28. In the embodiment according to FIG. 3, it is provided that pairs of the piezoelectric valves 51a to 51h are accommodated in a common reception shaft 52a to 52d each, wherein each reception shaft 52a to 52d is subject to a presettable pneumatic pressure level which can be released by the piezoelectric valves 51a to 51h accommodated in the respective reception shaft 52a to 52d and made available at connection points 53a to 53h. The reception shafts 52b and 52c are provided for an application of a supply pressure made available by a pneumatic source 54. The two reception shafts 52a and 52d, however, are connected to ambient pressure for communication and used for the removal of pressurised fluid. Preferably, a first connection point 53a is pneumatically connected to a third connection point 53c, while a second connection point 53b is pneumatically connected to a fourth connection point 53d, each forming a working port 55a and 55b respectively. In addition, a fifth connection point 53e is pneumatically connected to a seventh connection point 53g and a sixth connection point 53f is pneumatically connected to an eighth connection point 53h, each forming a working port 55c and 55d respectively. As a result, a supply pressure or an ambient pressure can optionally be applied to the working ports 55a to 55d.

Each of the working ports 55a to 55d of the illustrated embodiment is connected to a pneumatically piloted main valve 56a to 56d for optionally switching these main valves 56a to 56d, which are designed as 2/2-way valves in the illustrated embodiment, between a first and a second switching position, thereby optionally facilitating a provision or a removal of pressurised fluid to or from a fluidic load not shown in the drawing, which can be connected to output ports 74a, 74b.

In the illustrated embodiment, it is provided that a pressure sensor 36 and 37 respectively is assigned to each of the output ports 74a, 74b in order to provide the processing means 28 of the valve device 18 with electric pressure signals indicating the pressure level at the output ports 74a, 74b. Furthermore, a position sensor 41 to 44 designed for detecting a switching position of the respective main valve 56a to 56d is assigned to each main valve 56a to 56d. In another embodiment not shown in the drawing, the pneumatically piloted main valves can have different switching configurations, being designed as 3/2-way valves, 5/2-way valves or proportional valves, for example.

FIG. 4 shows a practical embodiment of the valve disc 50 shown in FIG. 3, the mechanical and fluidic design of which is known from EP 2 549 125 A1, which is therefore included to its full extent; a summary of the essential elements of the known valve disc follows for clarity. The reference numbers used in EP 2 549 125 A1 are adapted to the reference numbers of the present description of the figures.

The valve disc 50 comprises a valve module 57 and a main valve module 58, both being rectangular in design in the illustrated embodiment. On the narrow sides 59, 60 of the valve disc 50, contact means designed as tab connectors 61, 62 project, the tab connector 61 being electrically assigned to the valve module 57 and the tab connector 62 being electrically assigned to the main valve module 58. In the main valve module 58, there are provided several recesses 63, 64, 65, which are oriented normal to the intersecting plane of the representation according to FIG. 4 and which, if a plurality of valve discs 50 is lined up, form through-passages for a fluid supply to and a fluid discharge from the main valves 56a to 56d. In the same way, recesses are provided in the valve module 57 for a fluid supply to and a fluid removal from the piezoelectric valves 51a to 51h, which cannot be seen in FIG. 4.

The valve module 57 is connected to the main valve module 58 by elastic locking tabs 66 formed on a connecting part 67 between the valve module 57 and the main valve module 58. The locking tabs 66 have recesses 68 adapted to locking projections 69, 70 on the valve module 57 and the main valve module 58 and designed for positive coupling to these locking projections 69, 70. In addition to the mechanical coupling between the main valve module 58 and the valve module 57, the connecting part 67 provides the electric coupling of the position sensors assigned to the main valve module 58 and illustrated diagrammatically in FIG. 5 to the processing means 28 according to FIG. 3, which are not shown in detail in FIG. 4. Furthermore, signals of the position sensors can be made available at the tab connector 62. The third region 35 of the printed circuit board 29 shown in FIG. 1 and provided with the electric connections 40 is preferably located in the connecting part 67, in order to provide a simple electric coupling of the position sensors to the processing means 28.

On the narrow side of the valve module 57 remote from the main valve module 58, the first region 32 of the printed circuit board 29 shown in FIG. 1 with the electrically conductive connecting contacts 33 for the supply of the piezoelectric valves 51*a* to 51*h* is located. Between the first region 32 and the third region 35, the second region 34 of the printed circuit board 29 extends, facilitating a compact integration of the printed circuit board 29 into the valve module 57. In the illustrated embodiment, it is provided that the three regions 32, 34 and 35 of the printed circuit board are electrically and mechanically connected to one another by flexible board sections, so-called "flex prints". Using the tab connector 61, the valve assembly can be connected to a bus coupler not shown in the drawing for communication with a control device likewise not shown in the drawing.

The sectional view according to FIG. 4 provides a clearer impression of the structure of the valve module 57 and the main valve module 58. In a valve housing 71 of the valve module 57, four valve cartridges 72*a* to 72*d* are accommodated in reception shafts 52*a* to 52*d* in the illustrated embodiment, each of the four valve cartridges 72*a* to 72*d* comprising two piezoelectric valves 51*a* to 51*h*.

In the main valves housing 73 of the illustrated embodiment, four main valves 56*a* to 56*d* designed for optionally providing a supply pressure or an ambient pressure at the output ports 74*a*, 74*b* are accommodated.

In the diagrammatic representation of FIG. 5, a section 80 of the third region 35 of the printed circuit board 29 is shown in a plane view. This section 80 has a bore 81, which is designed for a fluidic connection between one of the valves of the valve module 57 and one of the valves of the main valve module 58 and which is also shown in FIG. 4 for orientation purposes. On one of the main surfaces of the section 80 shown in FIG. 5, a spiral conductor arrangement 82 is formed; this is conductively connected to an electronic component of the printed circuit board 29 not shown in detail and is arranged to be at least substantially concentric with the bore 81. The spiral conductor arrangement 82 serves as detector coil for the determination of an axial position of the associated main valve 56*a*, 56*b*, 56*c* or 56*d*. A sensor device using a detector coil is disclosed in PCT/EP2012/003051, which is herewith expressly included as subject matter of the present disclosure. With such a spiral conductor arrangement 82 integrated into the printed circuit board 29, the stroke position of the associated main valve 56*a*, 56*b*, 56*c* or 56*d* can be detected accurately on the basis of a cost-effective manufacturing process.

In a variant of the spiral conductor arrangement not shown in detail, the bore is located in the edge region of the spiral conductor arrangement and therefore only surrounded by a few windings, in particular the last winding, of the spiral conductor arrangement, whereby a measuring characteristic advantageous for certain measuring purposes and different from the concentric location of the bore in the spiral conductor arrangement can be obtained.

The invention claimed is:

1. A valve assembly for influencing at least one fluid flow, the valve assembly comprising a control unit and at least one valve device, wherein the control unit comprises:
   a bus interface for connection to a bus communication system for the reception of movement instructions;
   a processing device for processing the movement instructions into control commands for valve devices; and
   at least one connecting device for the electric coupling of the at least one valve device,
   and wherein the at least one valve device is electrically connected to the at least one connecting device of the control unit and comprises:
   a plurality of valves;
   a computer designed for processing the control commands;
   at least one first connecting contact assigned to the computer for the electric coupling of the plurality of valves; and
   at least one sensor selected form the group consisting of a pressure sensor and a position sensor,
   and wherein the computer is designed for linking sensor signals of the at least one sensor to the control commands and for processing of sensor signals provided by the at least one sensor, wherein the computer provides a pressure control for the valves based on signals of pressure sensors or a position control for the valves based on signals of position sensors, resulting in a control of the valves connected to the first connecting contacts.

2. The valve assembly according to claim 1, wherein the control unit is accommodated in a first housing and the at least one valve device is accommodated in a second, separate, housing, and wherein a conductor-bound connection is provided between the control unit and the valve device.

3. The valve assembly according to claim 1, wherein at least one pressure sensor for detecting a fluid pressure and/or at least one position sensor for detecting a valve position of a valve is/are connected to the second connecting means of the valve device.

4. The valve assembly according to claim 1, wherein at least one fluidic actuator is coupled to at least one of the valves, and wherein the processing device is designed for determining movement profiles for the at least one fluidic actuator, using movement instructions, and wherein the processing device and/or the computer is/are designed for converting the movement profiles into actuating signals for the valves.

5. The valve assembly according to claim 1, wherein at least one external sensor device is assigned to the processing device, and wherein the processing device is designed for a reception of the sensor signals of the at least one external sensor device via the lower-order bus communication system and for processing the sensor signals of the at least one external sensor device, and wherein the processing device comprises a storage device in which at least one control algorithm is stored.

6. The valve assembly according to claim 5, wherein the stored control algorithm is a position controller and/or a pressure controller.

7. The valve assembly according to claim 5, wherein at least one fluidic actuator is coupled to at least one of the valves, and wherein the at least one external sensor device is assigned to the actuator, and wherein the processing device and/or the computer, together with the sensor and/or the sensor devices form(s) a control loop for controlling a pressure for influencing a position of the actuator.

8. The valve assembly according to claim 1, wherein the computer is designed for transferring processed sensor signals of the sensor to the control unit.

9. The valve assembly according to claim 1, wherein the computer comprises at least one control means for a valve, which is designed for providing an electric supply energy, in particular a supply voltage, to at least one valve.

10. The valve assembly according to claim 1, wherein several independently selectable valves serving as pneumatic pilot valves are connected to the first connecting contact, and wherein the valves are coupled to pneumatically selectable main valves designed for providing fluid at working ports.

11. The valve assembly according to claim 10, wherein at least one working port is assigned a pressure sensor connected to the second connecting means of the valve device, and/or wherein at least one main valve is assigned a position sensor for detecting the valve position of the main valve.

12. The valve assembly according to claim 1, wherein the control unit and/or the valve device comprise(s) an ambient pressure sensor and/or a supply pressure sensor, and wherein the processing device is designed for a reception of a sensor signal of the ambient pressure sensor and/or of a sensor signal of the supply pressure sensor.

13. A fluidic system, comprising a control device designed for making available movement instructions to a higher-order bus communication system, comprising a higher-order bus communication system designed for a data communication between the control device and a valve assembly according to claim 1 which is connected to the higher-order bus communication system.

14. The fluidic system according to claim 13, wherein a bus coupler designed for a bidirectional conversion of bus commands between the higher-order bus communication system and a lower-order bus communication system is provided between the higher-order bus communication system and the control device, the lower-order bus communication system being formed between the bus coupler and the control device.

15. The fluidic system according to claim 14, wherein the valve assembly comprises a valve housing, in which valve shafts are formed for the accommodation of pairs of valve cartridges, and wherein it further comprises valve cartridges which are located in the valve shafts, wherein each of the valve shafts together with the valve cartridges located therein bounds a pressure chamber in fluidically communicating connection to an associated input port, and wherein each of the valve cartridges comprises two electrically selectable valves, each of which is designed to influence a free flow cross-section between the pressure chamber and an output port assigned to the respective valve.

16. The fluidic system according to claim 13, wherein at least one actuator is fluidically connected to the valve assembly, wherein at least one input/output device is connected to the bus communication system, and wherein the actuator is assigned at least one position sensor electrically connected to the input/output device to facilitate a provision of a position signal to the processing device.

\* \* \* \* \*